A. A. RATCLIFF.
NUT LOCK.
APPLICATION FILED DEC. 8, 1910.
1,110,511.
Patented Sept. 15, 1914.
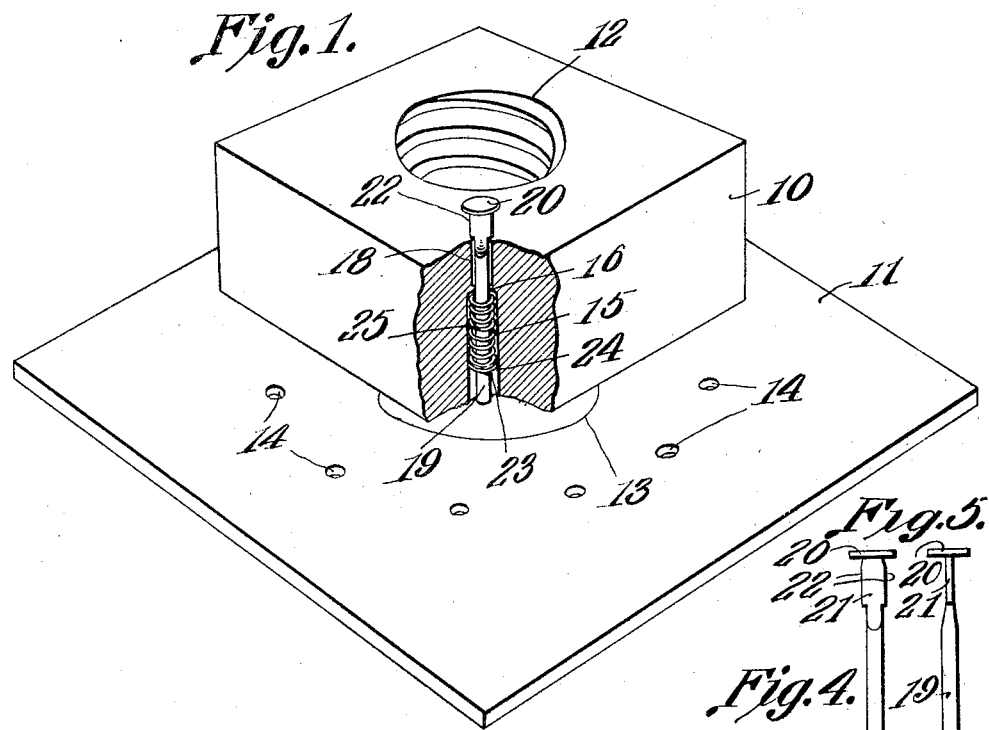
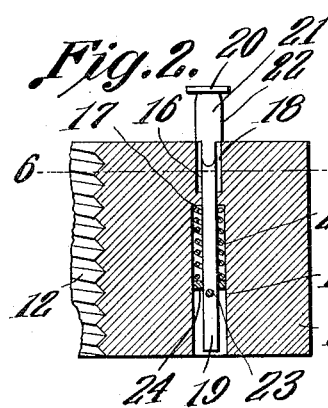
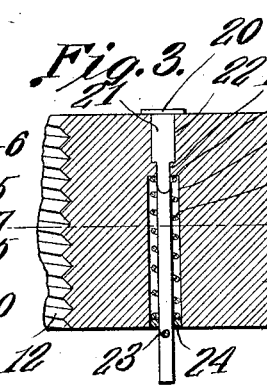
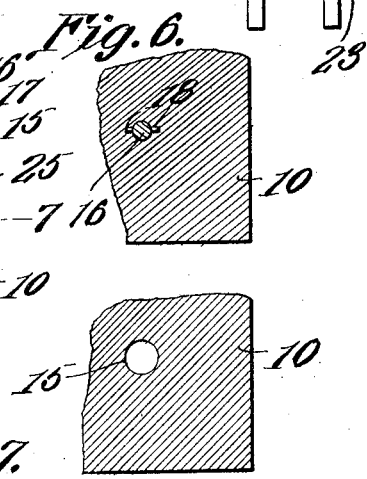
Witnesses
Alva A. Ratcliff, Inventor
by C. A. Snow & Co.
Attorneys

UNITED STATES PATENT OFFICE.

ALVA A. RATCLIFF, OF VERSAILLES, MISSOURI, ASSIGNOR OF ONE-HALF TO THOMAS P. BOND, OF VERSAILLES, MISSOURI.

NUT-LOCK.

1,110,511. Specification of Letters Patent. Patented Sept. 15, 1914.

Application filed December 8, 1910. Serial No. 596,282.

*To all whom it may concern:*

Be it known that I, ALVA A. RATCLIFF, a citizen of the United States, residing at Versailles, in the county of Morgan and State of Missouri, have invented a new and useful Nut-Lock, of which the following is a specification.

It is the object of the present invention to provide an improved construction of nut lock and the invention relates more particularly to that class of such devices which embody a nut carrying locking means to coöperate with a fixed washer plate.

The locking means which is carried by the nut, embodies a pin normally held by a spring to project at one end beyond that face of the nut which rests or bears against the washer plate, the washer plate being formed with openings or sockets for the engagement of the said end of the pin therein.

It is one aim of the present invention to so assemble this spring with the locking pin that the spring may be readily removed when it is desired to renew the spring or make other repairs to the said locking device.

With the above and other objects in view, the invention resides in the general construction and arrangement of parts set forth in the appended claim and illustrated in the accompanying drawings in which, Figure 1 is a perspective view of a nut and washer plate constructed in accordance with the present invention. Fig. 2 is a vertical sectional view showing the locking means in the position which it assumes while the nut is being turned upon the bolt. Fig. 3 is a similar view illustrating the locking means in locking position. Fig. 4 is a view in side elevation of the locking pin removed from the nut. Fig. 5 is a similar view at right angles to Fig. 4. Fig. 6 is a sectional view on the line 6—6 of Fig. 2, the locking pin being removed. Fig. 7 is a view similar to Fig. 6 on the line 7—7 of Fig. 3 also illustrating the locking pin removed.

In the drawings, the numeral 10 indicates the nut and 11 the washer plate with which the nut coöperates, the nut being formed with the usual bolt opening 12 and the washer plate being formed with the usual opening 13 and surrounding this opening is a series of openings 14. The nut is formed, to one side of its bolt opening 12, with a bore 15 and a bore 16. The bore 15 is of greater diameter than the bore 16 and at the juncture of the two bores there is a shoulder 17. The wall of the bore 16 is formed at diametrically opposite points with grooves 18 and this bore opens through the outer face of the nut 10 whereas the bore 15 opens through the inner face of the nut or in other words that face which bears against the washer plate 11.

The locking pin heretofore mentioned is indicated in the drawings by the numeral 19 and is provided at one end with a head 20 which is preferably flat. The pin 19 is flattened as at 21 to form diametrically oppositely located ribs 22 which are of the same length as the grooves and are designed to seat therein when the pin is in locking position, as illustrated in Fig. 3 of the drawings. When the pin is in this position, the inner ends of the ribs 22 seat at the inner ends of the grooves 18 and the head 20 of the pin rests flat against the outer face of the nut 10. The bores 15 and 16 are axially alined and the pin 19 fits through the bore 15. A stop pin 23 is removably inserted through the pin 19 at a point to be presently particularly specified and a collar 24 is fitted upon the pin and rests against the stop pin 23. A spring 25 is fitted upon the pin 19 and bears at one end against the shoulder 17 and at its other end against the collar 24. The distance between the inner ends of the ribs 22 and the point of insertion of the stop pin 23 through the pin 19 is equal to the length of the bores 15 and 16 from the outer end of the bore 15 to the inner ends of the grooves 18 in the wall of the bore 16. As a consequence, when the pin is in locking position as illustrated in Fig. 3 of the drawings, the stop pin 23 will be presented at the said end of the bore 15 and may be withdrawn from engagement through the locking pin 19, should it be desired, for any reason, to remove the spring 25 or the said locking pin.

It will be readily understood that the locking pin 19 may be retracted against the tension of the spring 25 until the inner ends of its ribs 22 register with the outer end of the bore 16 and the pin may then be rotated so as to seat the said ends of its ribs against the outer face of the nut at the edge of the open end of the bore 16, the pin being thus held retracted or in other words in the position shown in Fig. 2 of the drawings, while the nut is being threaded upon a bolt. When the nut has been properly tightened, the pin is turned back to bring its ribs in alinement with the grooves 18 in the wall of the bore 16 and is then released whereupon the spring 25 will force its end opposite its headed end into one or another of the openings 14 in the washer plate 11.

What is claimed is:

The combination with an apertured base washer, of a nut having a bore extending therethrough at a point removed from the bolt receiving opening in the nut, the outer end portion of the bore being provided with opposed longitudinal grooves, a spring controlled locking pin insertible into the bore and having a head at its outer end and a flattened portion adjacent the head, providing diametrically opposed longitudinal ribs extending up to the head, said ribs being adapted to be seated in the grooves to hold the pin against rotation, that portion of the pin between its inner end and the ribs being of uniform diameter to permit its insertion through the bore in the nut, the head on the pin being adapted to rest upon the nut and to close the spaces at the sides of the flattened portion of the pin when the pin is seated in the bore.

In testimony that I claim the foregoing as my own, I have hereto affixed my signature in the presence of two witnesses.

ALVA A. RATCLIFF.

Witnesses:
  I. M. SCHANNEP,
  K. C. JONES.

Copies of this patent may be obtained for five cents each, by addressing the "Commissioner of Patents, Washington, D. C."